Jan. 26, 1960 F. H. BENNER, SR 2,922,244
FISHING LURE
Filed Sept. 10, 1956
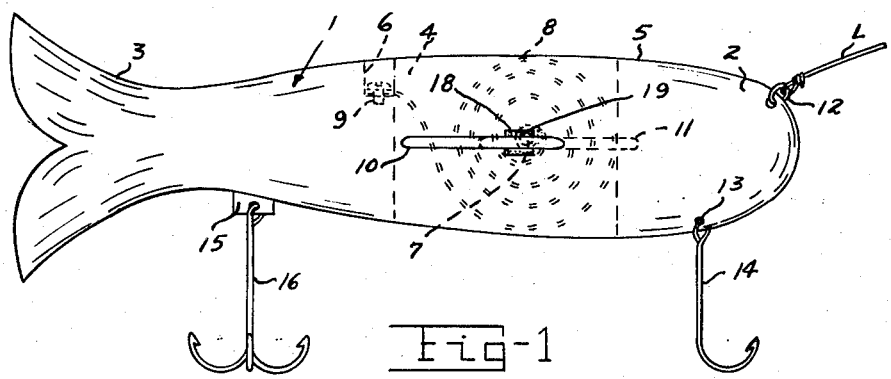
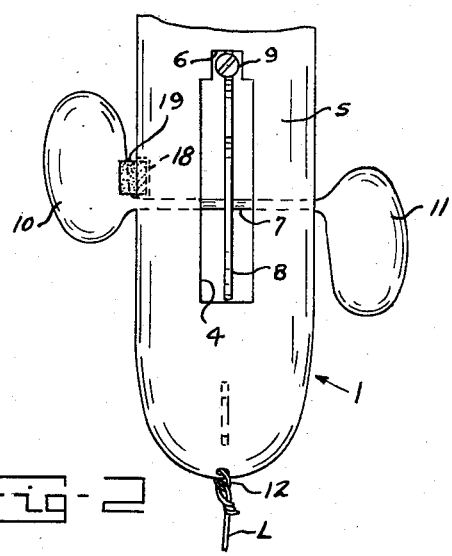
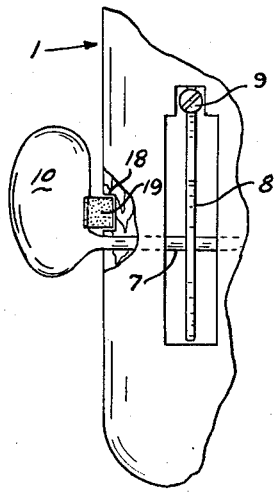
INVENTOR.
FRANKLIN H. BENNER, SR.
BY Tom Walker
ATTORNEY United States Patent Office 2,922,244
Patented Jan. 26, 1960

2,922,244

FISHING LURE

Franklin H. Benner, Sr., Dayton, Ohio

Application September 10, 1956, Serial No. 608,866

2 Claims. (Cl. 43—26.2)

This invention relates to fishing lures and more particularly to a mechanized lure of an improved nature simulating a small live fish.

The prior art is replete with fishing lures of various sizes, shapes, form and color. The object through the years has been to contrive a device which would have such an appearance in the water as to either stimulate the curiosity of the fish to take the lure and hook attached or else give an appearance of edible materials acceptable to fish and thereby cause the fish to strike and be hooked. In the devices in the former category color and shape are pre-dominant features while the prior art devices in the later category generally employ particular shapes and require a particular control of the line to move the lure and the connected fishing hook so as to give it a live appearance.

The subject invention takes a step forward in the art to provide a fishing lure incorporating an automatically operable means to provide an authentic life-like motion to the lure. In the use of this lure the line need not be operated in a manner to unduly disturb the surface of the water as so often occurs in the use of the prior art devices. The movement inducing mechanism of the present invention is preferably spring controlled and self operating at a predetermined interval after being placed in the water to effect a propulsion of the lure with an induced wobble motion. The net effect is to provide a simulation of a live fish or the like which is acting under its own volition. The fish are thereby thrown off guard and more readily induced to strike the lure and be hooked in the process.

The object of the invention is to simplify the construction as well as the means and mode of operation of fishing lures, whereby such lures may not only be economically manufactured, but will be more efficient and satisfactory in use, adaptable to a wide variety of applications, and be unlikely to get out of repair.

Another object of the invention is to provide a fishing lure which simulates a live fish.

A further object of the invention is to provide a mechanized lure automatically affording a self propulsion thereof at a predetermined interval after being placed in the water.

An additional object of the invention is to provide an improved lure of a shaped nature which incorporates automatically acting propulsion means inducing a wobble motion thereto in the water so as to simulate a live creature such as serves as food for the fish which are being sought.

A further object of the invention is to provide a fishing lure possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention:

Fig. 1 is a side view of the fishing lure in accordance with the preferred embodiment of the invention;

Fig. 2 is a fragmentary top view of the device of Fig. 1; and

Fig. 3 is a view similar to that of Fig. 2, but partially broken away for clarity of detail.

Like parts are indicated by similar characters of reference throughout the several views.

The invention can be best described with reference to the drawings. The preferred embodiment shown employs a body 1 having the configuration of a small fish and including a head 2 and a tail 3 integral therewith. This body 1 is shown as formed of a solid block of wood of a lightweight nature. However, it may be molded of plastic so as to be either solid or hollow without departing from the spirit of the invention. A rectangular slot 4 is provided through the center section of the body 1, vertically thereof. Adjacent the slot 4 in the upper surface 5 of the body 1 is a recess 6 which opens into slot 4.

Extending transversely through body 1 centrally thereof is a shaft 7. This shaft 7 bridges the slot 4 intermediate the upper and lower surfaces of body 1. A spring 8 has one end connected to shaft 7 centrally in the slot and is coiled several times thereabout in the fashion of a clock spring. The other end of the spring seats in recess 6 and is connected to the body 1 therein by a screw 9. The shaft 7 is thereby put under a bias by spring 8 to tend to resist rotation thereof in a counterclockwise direction, as seen from Fig. 1 of the drawings. Wing or paddle elements 10 and 11 are connected to the respective ends of the shaft 7 and form extensions thereof laterally of body 1. The paddles 10 and 11 are connected to shaft 7 so as to project therefrom in divergent directions at either end thereof.

An eyelet 12 is connected in the head 2 of the body 1 for connecting the fishing line L to the lure. At the forward underside portion of body 1 is an aperture 13 through which is connected the upper end of a hook 14 which is suspended thereby from the body 1. At the rear underside portion of body 1 adjacent the tail 3 is fixed an apertured plate 15 which has the upper end of a hook element 16 threaded therethrough to mount the hook in depending relation thereto.

The spring 8 is normally not loaded. In this condition of the spring, the flap elements 10 and 11 are disposed substantially horizontally relative to the body 1 and in a central plane thereof. In the side of body 1 adjacent paddle 10 is a rectangular recess 18 which is substantially aligned with the paddle 10 when the paddles are in their horizontal position.

Prior to casting, the paddles 10 or 11 are turned to rotate shaft 7 in a counterclockwise direction, noting Fig. 1, to thereby contract spring 8 and apply an opposed bias thereon against its normal bias. This being accomplished, a plug or detent 19 of hard sugar, or other chemical composition dissolvable by water in a predetermined period or interval, is inserted in the recess 18 in body 1 and caused to engage paddle 10 as it is moved to horizontal position so as to hold or detent the paddle in the position to which it has been turned. Thus, the spring is maintained in its coiled contracted position with energy stored therein.

On casting, the lure will seek its depth in the water in a smooth fashion, due to the configuration of body 1. After the lure has been in the water a predetermined interval in accordance with the composition of the plug, the plug will dissolve. This releases the flap 10. The shaft 7 and the connected spring 8 are thereby released and the stored energy of the spring energizes the shaft 7 and the paddle elements 10 and 11 connected thereto. As the shaft is rotated by the spring, the flaps 10 and 11 are accordingly rotated. This causes a propulsion of the fish-like body 1 and induces a wobble motion thereof due to the offset nature of the paddles. This action causes an authentic simulation of a live fish since the lure is dragging the line as it moves rather than the line dragging the lure. The device is thus self propelled in a deceptive life-like wobbling fashion. It renders it very difficult for a fish to perceive the artificial nature of the lure. Accordingly, the advantages resulting are obvious to those versed in the art.

It is noted that the materials employed in the invention may be varied without departing from the principles thereof. While the body 1 is shown to be fish-like in character, it may be readily diminished or increased in size and formed to simulate the appearance of insects or the like while retaining the inventive concepts.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A fishing lure comprising, a body element of a streamline configuration, said body element having a vertical aperture therethrough, a propeller shaft extending transversely through said body element and said aperture, a spring element connected to said shaft centrally thereof and coiled thereabout in the fashion of the clock spring to have the outer end thereof connected to said body member, paddle elements integrally connected to said shaft externally of said body member, hook means connected to said body member, a notch in said body member adjacent at least one of said paddle members and detent means seated in the notch in said body member to hold said paddle members on revolving said paddle members to contract said spring for energization thereof, said detent element being responsive to immersion of the lure in the water to release said paddle elements and thereby enable a drive of said paddle elements through said shaft by said spring for a shelf propulsion of said body member to simulate a live fish or the like thereby.

2. A fishing lure comprising, a body element of a streamline configuration, said body element having a vertical aperture therethrough, a propeller shaft extending transversely through said body element and through said aperture thereby, a spring element connected to said shaft centrally thereof and coiled thereabout in the fashion of a clock spring to have the outer end thereof connected to said body member, paddle elements integrally connected to said shaft externally of said body member, hook means connected to said body member, a notch in said body member adjacent one of said paddle elements and detent means seated in the notch in said body member to engage said one paddle member on revolving said paddle members to contract said spring for energization thereof, said detent element being responsive to immersion of the lure in the water to disengage said one paddle element and thereby enable a drive of said paddle elements through said shaft by said spring for a self propulsion of said body member to simulate a live fish or the like thereby, said paddle elements being connected to the extremities of said shaft so as to respectively project from said shaft in directions which are 180 degrees apart so that on drive of said shaft said paddle members will effect a wobble action of said body member to provide authenticity to the body member in propulsion thereof to deceptively indicate a fish-like motion thereto.

References Cited in the file of this patent

UNITED STATES PATENTS

| | | |
|---|---|---|
| 742,326 | Humphrey | Oct. 27, 1903 |
| 2,430,114 | Helmus | Nov. 4, 1947 |
| 2,468,877 | Horton | May 3, 1949 |

FOREIGN PATENTS

| | | |
|---|---|---|
| 579,591 | France | Aug. 6, 1924 |